United States Patent
Eswaran et al.

(10) Patent No.: US 11,752,486 B2
(45) Date of Patent: Sep. 12, 2023

(54) REACTOR FOR POLYMERIZATION PROCESS

(71) Applicant: ExxonMobil Chemical Patents Inc., Baytown, TX (US)

(72) Inventors: Vetkav Eswaran, Houston, TX (US); Kevin B. Daly, Jersey City, NJ (US); Hari Nair, Spring, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 305 days.

(21) Appl. No.: 17/074,705

(22) Filed: Oct. 20, 2020

(65) Prior Publication Data

US 2021/0121846 A1 Apr. 29, 2021

Related U.S. Application Data

(60) Provisional application No. 62/927,416, filed on Oct. 29, 2019.

(51) Int. Cl.
*B01J 19/24* (2006.01)
*B01J 19/00* (2006.01)

(52) U.S. Cl.
CPC ......... *B01J 19/2435* (2013.01); *B01J 19/006* (2013.01); *B01J 19/0013* (2013.01); *B01J 2219/00083* (2013.01)

(58) Field of Classification Search
CPC .. B01J 19/2435; B01J 19/0013; B01J 19/006; B01J 2219/00083; B01J 2208/00849;
(Continued)

(56) References Cited

U.S. PATENT DOCUMENTS 5,256,732 A 10/1993 Morita et al.
5,726,258 A 3/1998 Fischer et al.
(Continued)

FOREIGN PATENT DOCUMENTS

CN 202109797 U * 1/2012
EP 0 087 817 A1 9/1983
(Continued)

OTHER PUBLICATIONS

Nickolay, Markus et al., Improved approximation for the Nusselt number for hydrodynamically developed laminar flow between parallel plates, International Journal of Heat and Mass Transfer (2002) 45, 3263-3266.
(Continued)

*Primary Examiner* — Huy Tram Nguyen

(57) ABSTRACT

In one embodiment, a reactor includes a reactor body and a reactor head. The reactor head has a reactor head body and one or more inlets disposed tangentially to the reactor head body. In one embodiment, a polymerization process for forming polymer includes introducing in a first direction a stream including a monomer. The stream and a catalyst system are flowed in a second direction through at least one internal heat exchanger. The second direction is substantially orthogonal to the first direction. The reaction zone includes at least one internal heat exchanger. At least a portion of the monomer of the stream is polymerized in the reaction zone to produce a polymer product. The polymer product is recovered from the reaction zone.

26 Claims, 9 Drawing Sheets

(58) Field of Classification Search
CPC .... B01J 2208/00929; B01J 2208/00938; B01J 2219/00038; B01J 4/00; B01J 4/005; B01J 8/0492; B01J 8/0496; B01J 8/1827; B01J 2208/00141; B01J 2208/00203; B01J 19/24; B01J 8/1836
USPC ......................................................... 526/64
See application file for complete search history.

(56) References Cited

U.S. PATENT DOCUMENTS

| | | |
|---|---|---|
| 10,544,246 B2 | 1/2020 | Jiang et al. |
| 2017/0088647 A1 | 3/2017 | Reimers et al. |
| 2019/0247821 A1 | 8/2019 | Eswaran et al. |
| 2020/0147576 A1 * | 5/2020 | Van Geem ............... B01J 8/386 |

FOREIGN PATENT DOCUMENTS

| | | | | |
|---|---|---|---|---|
| GB | 1 569 518 A | 6/1980 | | |
| WO | WO-2019002385 A1 * | 1/2019 | ................ | B01F 7/28 |
| WO | 2019/156802 A1 | 8/2019 | | |

OTHER PUBLICATIONS

Daly et al., U.S. Appl. No. 62/927,399, filed Oct. 29, 2019.

* cited by examiner

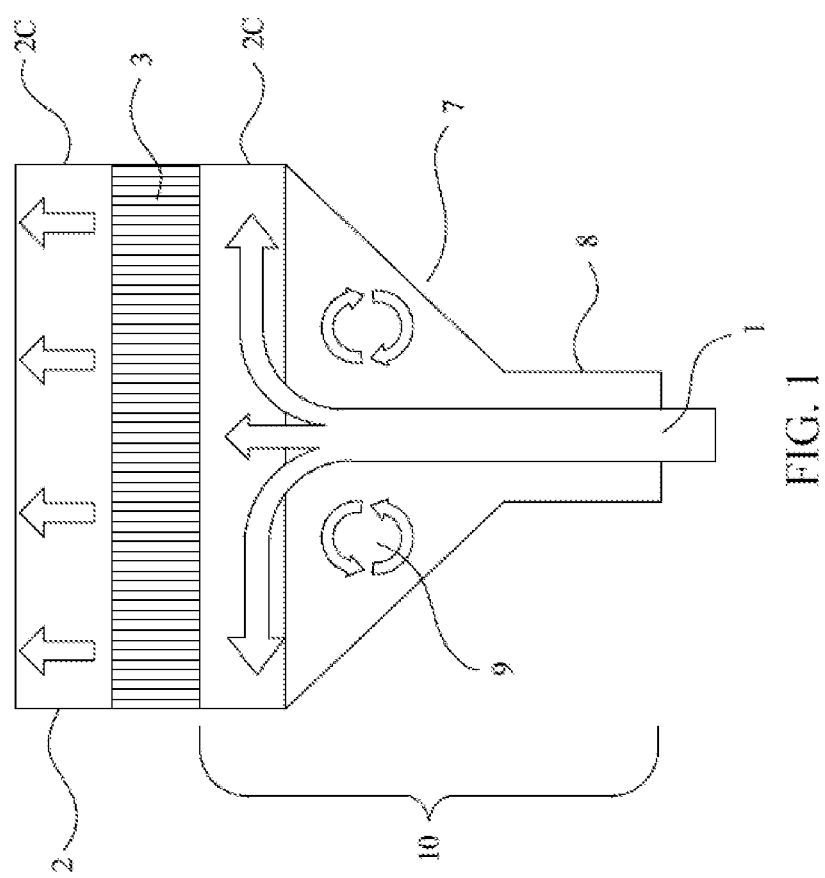

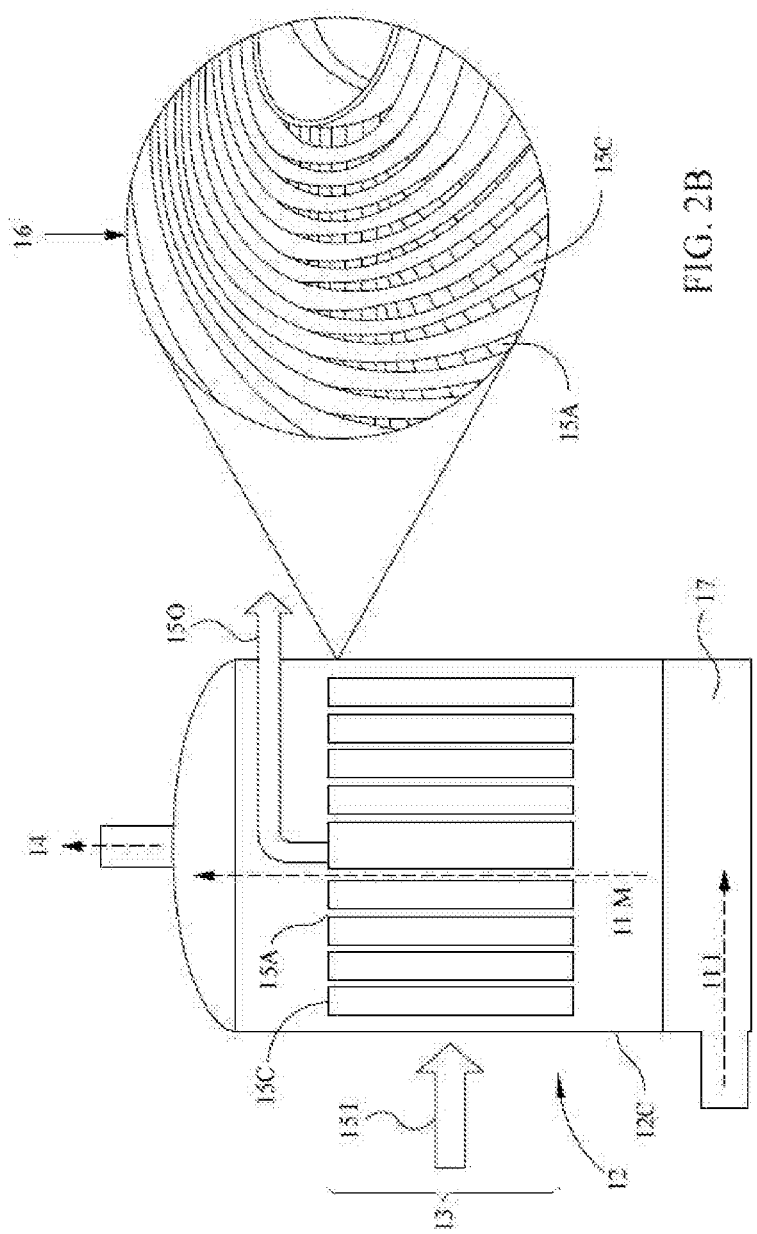

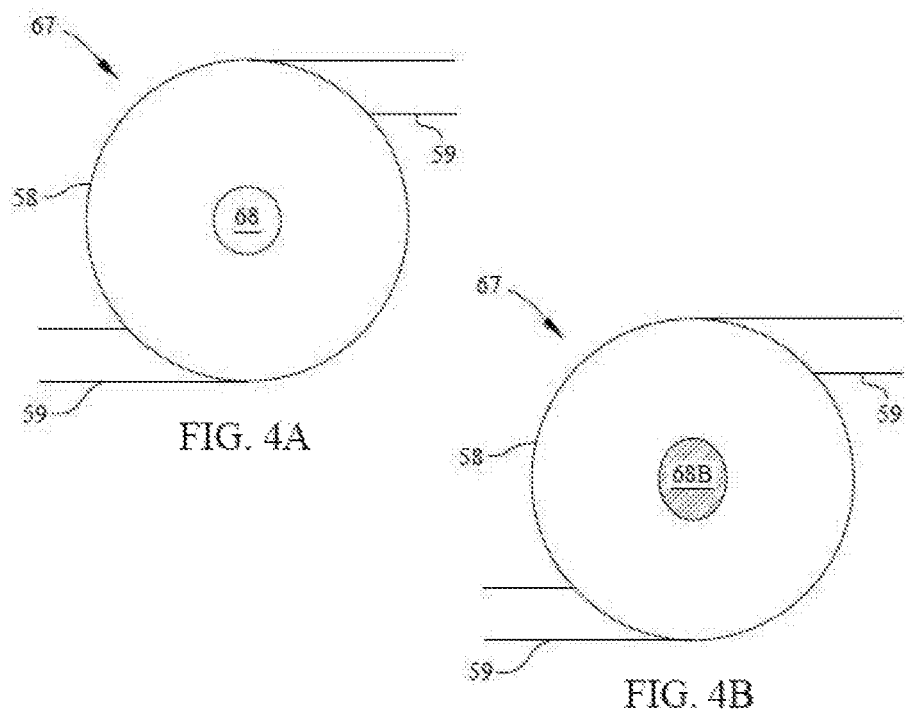
FIG. 4A
FIG. 4B
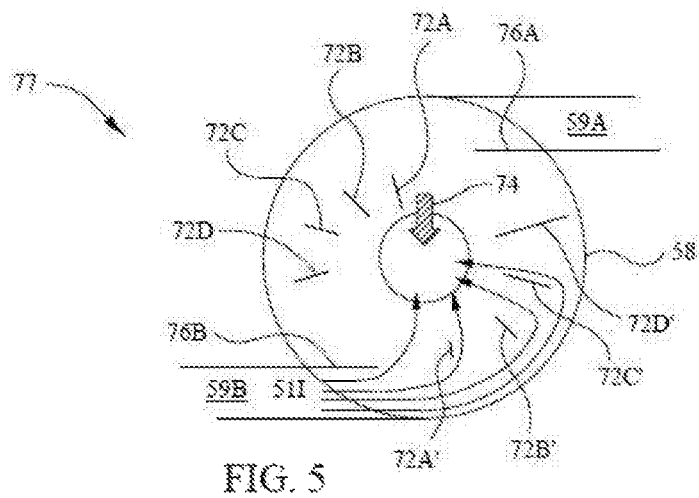
FIG. 5

REACTOR FOR POLYMERIZATION PROCESS

CROSS-REFERENCE TO RELATED APPLICATIONS

This application claims the priority benefit of U.S. Ser. No. 62/927,416, filed Oct. 29, 2019, the disclosure of which is incorporated herein by reference.

FIELD

The present disclosure relates to a polymerization reactor and polymerization process utilizing an internal heat exchanger, such as a spiral heat exchanger.

BACKGROUND

Unsaturated monomers, particularly olefin monomers, are polymerized in a variety of polymerization processes using a wide variety of catalysts and catalyst systems. A common polymerization process used in the production of olefin based polymers such as polyethylene or polypropylene (homopolymers as well as copolymers), is a liquid phase based process, such as in a solution process or in a slurry process.

In a solution process, the formed polymer is dissolved in the polymerization medium. Often, the catalyst and monomer are also completely dissolved in the polymerization medium, but that is not a requirement of a solution process. In a typical solution process, the polymerization temperature may be at, above or below the melting point of the dry polymer. For example, in typical solution phase polyethylene processes, polymerization can be conducted in a hydrocarbon solvent at temperatures above the melting point of the polymer and the polymer is typically recovered by vaporization of the solvent and any unreacted monomer. In some cases solvents or diluents are used, while in others the monomer to be polymerized also acts as the solvent (e.g. a bulk polymerization process). In each of these solution systems, there remain factors that influence not only the rate at which the polymerization can run, but can also influence the microstructure and properties of polymer produced. In a typical solution process, the polymer formed is dissolved in the solvent. The higher the concentration of the polymer, the higher the viscosity of the polymerization reaction mixture containing polymer, monomers and solvent. The maximum polymer concentration that can be handled is limited by the viscosity of the solution. The higher the viscosity, the poorer the heat transfer and higher the power requirement for pumping—all of which determine the technical and economic feasibility. This is especially of concern when producing polymers with high molecular weight.

Liquid phase polymerization may be performed in a variety of reactors to manufacture a variety of polymers, such as olefin based polymers and copolymers, such as polyethylene and polypropylene copolymers. A continuous flow stirred tank reactor (CFSTR) is one example of a reactor that may be used to carry out the liquid phase polymerization. A tubular reactor (TR) is another example of a reactor that may be used to conduct liquid phase polymerization. One setback of a liquid phase polymerization process performed in TRs is that the mixing is poorer than in a CFSTR, which results in non-uniform reaction temperature and monomer and/or catalyst concentration, which then affect the uniformity of the properties of the polymer produced. Therefore, there is a need for improved apparatuses and processes for liquid phase polymerization in TRs.

SUMMARY

In at least one embodiment, a reactor includes a reactor body and a reactor head. The reactor head has a reactor head body and one or more inlets disposed tangentially to the reactor head body. In another embodiment, the reactor further includes one or more baffles proximate each of the one or more inlets. In yet another embodiment, the reactor further includes a first baffle, a second baffle, or even more baffles proximate each of the one or more inlets.

In an embodiment, a polymerization process for forming polymer includes introducing a stream containing one or more monomers and optionally catalyst or catalyst components into the reactor body in a first direction. Then, the stream is flowed in a second direction through at least one internal heat exchanger. The second direction is substantially orthogonal to the first direction. A reaction zone includes the at least one internal heat exchanger. At least a portion of the monomer of the streams is polymerized in the reaction zone to produce a polymer product. The polymer product is recovered from the reaction zone.

BRIEF DESCRIPTION OF THE DRAWINGS

So that the manner in which the above recited features of the present disclosure can be understood in detail, a more particular description of the disclosure briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 is a schematic illustration of a side cross-sectional view of an axial reactor head.

FIG. 2A is a schematic illustration of some embodiments of a side cross-sectional view of a reactor including at least one internal heat exchanger.

FIG. 2B is a schematic illustration of a top perspective view of one of the internal heat exchangers of FIG. 2A having a spiral heat exchanger with spiral coolant flow channels for flowing cooling fluid in which a reaction mixture is flowed between the spiral coolant flow channels.

FIG. 4A is a schematic illustration of a top cross-sectional view of some embodiments of a reactor head with one or more tangentially disposed inlets and with one or more axial inlets.

FIG. 4B is a schematic illustration of a top cross-sectional view of some other embodiments of a reactor head with one or more tangentially disposed inlets and a cylindrical projection.

FIG. 5 is a schematic illustration of a top cross-sectional view of some embodiments of a reactor head with one or more tangentially disposed inlets and one or more baffles proximate each inlet.

Figure 3A:
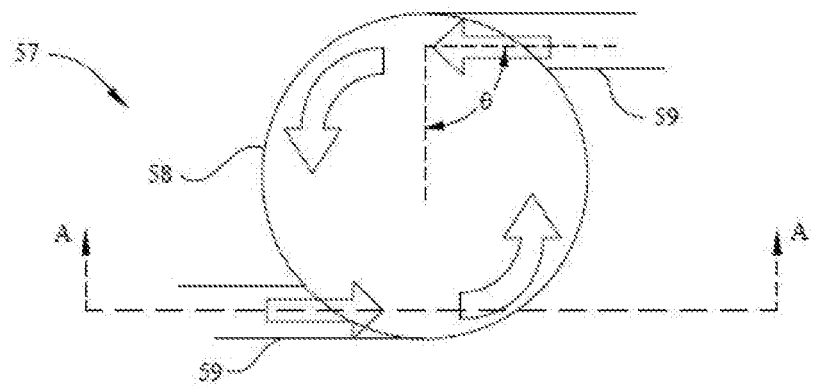
FIG. 3A is a schematic illustration of a top cross-sectional view of some embodiments of a reactor head with one or more inlets disposed tangentially to a body of the reactor head.

To facilitate understanding, identical reference numerals have been used, where possible, to designate identical elements that are common to the figures. It is contemplated that elements disclosed in at least one embodiment may be beneficially utilized on other embodiments without specific recitation.

DETAILED DESCRIPTION

Embodiments will now be described in greater detail below, including specific embodiments, versions and examples, but the embodiments are not limited to these embodiments, versions or examples, which are included to enable a person having ordinary skill in the art to make and use the embodiments, when the information in this patent is combined with available information and technology.

Various terms as used herein are defined below. To the extent a term used in a claim is not defined below, it should be given the broadest definition persons in the pertinent art have given that term as reflected in one or more printed publications or issued patents.

A "reaction zone," also referred to as a "polymerization zone," means a container where polymerization takes place, for example, a batch reactor or continuous reactor. When multiple reactors are used in either series or parallel configuration, each reactor may be considered as a separate reaction zone or a separate polymerization zone. Alternatively, a reactor may include one or more reaction zones or polymerization zones. For a multi-stage polymerization in both a batch reactor and a continuous reactor, each polymerization stage is considered as a separate polymerization zone.

The term "continuous" means a system that operates without interruption or cessation. For example, a continuous process to produce a polymer would be one where the reactants are continually introduced into one or more reactors and polymer product is continually withdrawn.

A "solution polymerization" means a polymerization process in which the polymer is dissolved in a liquid polymerization medium, such as an inert solvent or monomer(s) or their blends.

A "bulk polymerization" means a polymerization process in which the monomers and/or comonomers being polymerized are used as a solvent or diluent using little or no inert solvent as a liquid or diluent. A small fraction of inert solvent might be used as a carrier for a catalyst and a scavenger. A bulk polymerization system contains less than 25 wt % of inert solvent or diluent, such as less than 10 wt %, such as less than 1 wt %, preferably 0 wt %.

A "slurry polymerization" means a polymerization process where at least 95 wt % of polymer products produced are in granular form as solid particles not dissolved in the diluent.

FIG. 1 is a schematic illustration of some embodiments of a side cross-sectional view of an axial reactor head 7. The reactor head 7 is shaped as a cone with an axial inlet 8 axially oriented to a central axis of the cone. The axial inlet 8 provides an introductory flow path 1 upward into a vertically oriented reactor 2 towards and through an internal heat exchanger 3. Hot spots 9 undesirably develop in the flow from the axial inlet 8 towards the internal heat exchanger 3. The hot spots 9 are small zones of recirculation that develop within the introductory flow path 1 of a feed stream and/or a recirculating stream where the temperature of the hot spots 9 is higher than the average reactor temperature.

The internal diameter of the reactor head 7 increases to the internal diameter of a cylindrical body 2C of the reactor 2. The velocity of the introductory flow path 1 does not slow down causing the introductory flow to impinge on the internal heat exchanger 3. The momentum of the introductory flow is not dissipated and, thus, causes short circuiting or maldistribution of the introductory flow into the internal heat exchanger 3 and leading to development of the hot spots 9.

The temperature distribution in a reactor head 7 where the inlet section expands from the internal diameter of the inlet 8 to an internal diameter of the cylindrical body 2C of the reactor 2 dimensions may have a temperature difference as high as 70° C. or more from the center of the introductory flow path 1 of a feed stream and/or a recirculating stream in the entrance zone 10 to the hot spots 9 at an outer edge of the introductory flow path 1 of a feed stream and/or a recirculating stream.

The inventors have developed a new reactor design that reduces or eliminates the hot spots found in prior art reactor designs. In some embodiments, a reactor includes a reactor body and a reactor head having one or more inlets disposed tangentially to the reactor head body. A polymerization process for forming polymer includes providing an introductory flow of a feed stream and/or a recirculating stream in a first direction from the one or more inlets of the reactor head. In some embodiments in a solution polymerization process, the introductory flow comprises a solvent optionally with or without monomers and optionally with or without catalysts or catalyst components. In some embodiments in a solution polymerization process, the introductory flow comprises a solvent, monomer(s), and a catalyst causing an exothermic reaction in the reactor head. The introductory flow transitions into a main flow. The main flow is provided in a second direction through a reaction zone orthogonal to the first direction. The reaction zone includes at least one internal heat exchanger, such as at least one spiral heat exchanger. In some embodiments, without being bound by theory it is believed at least a portion of the monomer is polymerized in the reaction zone to produce a polymer product. By introducing the flow of the monomer through one or more inlets disposed tangentially to the reactor head body, temperature variation within the entrance zone of the reactor is reduced.

FIG. 2A is a schematic illustration of some embodiments of a side cross-sectional view of a reactor 12 including at least one internal heat exchanger 13. The reactor 12 includes a reactor head 17 coupled to a cylindrical body 12C of the reactor 12. An introductory flow path 11I of a feed stream and/or a recirculating stream of monomer (with or without one or more comonomers), a catalyst system, and an optional solvent enter the reactor 12 through the reactor head 17.

The introductory flow path 11I transitions to a main flow path 11M of a feed stream and/or a recirculating stream of monomer (with or without one or more comonomers), catalyst system, polymer product, and optional solvent that flows through the internal heat exchanger 13. As shown in FIG. 2A, the main flow path 11M may be along a length of the reactor (e.g., upward through a vertically oriented reactor 12). In other embodiments, the main flow path be along another a length of the reactor (e.g., downward from a reactor head disposed on top of a vertically oriented reactor). In other embodiments, the main flow path may be along another length of the reactor (e.g., sideways through a horizontally oriented reactor).

The internal heat exchanger 13 includes one or more heat exchange medium flow channels 15C and includes at least one heat exchanger inlet 151, and at least one heat exchanger outlet 150 in fluid communication with the at least one heat exchange medium flow channel 15C. The heat exchange medium flow channel 15C of the internal heat exchanger 13 span a segment of the reactor 12, such as an interior diameter of the reactor. A heat exchange medium is provided from the heat exchanger inlet 151 to the heat exchange medium flow channel 15C and is removed by the heat exchanger outlet 150. The internal heat exchanger 13 includes one or more heat exchanger apertures 15A for the main flow path 11M of a feed stream and/or a recirculating stream to flow through the internal heat exchanger 13. Each heat exchanger 13 in a reactor 12 may be considered a separate reaction zone or stage. The monomer contacts the catalyst system in the reaction zone thereby forming polymer. A product stream 14 comprising polymer product, unreacted monomer, and quenched or unquenched catalyst system exits the reactor 12. In some embodiments, a center line of the internal heat exchanger 13 is substantially aligned with the center line of the cylindrical body 12C of the reactor 12. In some embodiments, a center line of the internal heat exchanger 13 is asymmetric or offset with the cylindrical body 12C of the reactor 12.

FIG. 2B is a schematic illustration of some embodiments of a top perspective view of one of the internal heat exchangers 13 of FIG. 2A having a spiral heat exchanger 16. The spiral heat exchanger includes one or more exchanger medium flow channels 15C in the shape of one or more spirals. The spirals may be arranged radially around an axis of a cylindrical body 12C of the reactor 12. The spiral heat exchanger 16 may be any suitable spiral heat exchanger. Non-limiting examples of suitable spiral heat exchangers include those described in U.S. Pat. Nos. 8,622,030; 8,075,845; 8,573,290; 7,640,972; 6,874,571; 6,644,391; 6,585,034; 4,679,621; and US publications 2010/0170665; 2010/0008833; 2002/0092646; 2004/0244968, each of which are incorporated herein by reference.

As shown in FIGS. 2A and 2B, the main flow path 11M of a feed stream and/or a recirculating stream flows through the apertures 15A of the internal heat exchangers 13 thereby controlling the temperature of the monomer, the catalyst system, the polymer product, and the optional solvent as it travels through the at least one internal heat exchanger 13. The main flow path 11M of a feed stream and/or a recirculating stream flows through the at least one internal heat exchanger 13 in a cross-flow direction relative to the heat exchanger flow channels 15C. As used herein, "cross-flow" direction refers to the main flow path 11M in a direction substantially orthogonal to a flow of a heat exchange medium through the heat exchange medium flow channels 15C. Flow paths having directions that are substantially orthogonal may include flow of the monomer, catalyst system, polymer product, and optional solvent at an angle of about 70° to about 110°, such as about 80° to about 100°, such as about 85° to about 95°, such as about 88° to about 92°, such as about 90° with respect to the heat exchanger flow channels 15C of the at least one internal heat exchanger 13.

As shown in FIGS. 2A and 2B, the at least one internal heat exchanger 13 may be oriented in a first direction where solvent with or without the monomer, with or without the catalyst system, and with or without the polymer product may flow in the first direction through the at least one internal heat exchanger 13. In some embodiments, the orientation of the at least one internal heat exchanger 13 in a first direction can be oriented in any suitable direction so long as the solvent with or without monomer, with or without the catalyst system, and with or without the polymer product flow through the at least one internal heat exchanger 13 in a cross-flow direction relative to the heat exchange medium flow channels 15C of the at least one internal heat exchanger 13. For example, the at least one internal exchanger 13 may be oriented in a vertical direction, where the solvent, with or without monomer, with or without the catalyst system, and with or without the polymer product may flow through the at least one internal heat exchanger 13 in a vertical direction. In another example, the at least one internal exchanger 13 may be oriented in a horizontal direction, where the solvent, with or without monomer, with or without the catalyst system, and with or without the polymer product may flow through the at least one internal heat exchanger 13 in a horizontal direction.

The heat exchanger medium flow channels 15C of the at least one internal heat exchanger 13 may flow any suitable heat exchange medium. Particularly useful heat exchange media are those stable at the reaction temperatures. Examples of heat exchange media include, water, aqueous solutions, oil (e.g., hydrocarbons, such as mineral oil, kerosene, hexane, pentane, and the like), and synthetic media, such as those available from The Dow Chemical Company (Midland, Mich.) under the trade name DOWTHERM™, such as grades A, G, J, MX, Q, RP, and T, and those available from EASTMAN Chemical Company under the trade name Therminol™, such as grades 59, XP, etc. If water or other low boiling point fluids are used, then these may be under a suitable amount of pressure to prevent boiling. In at least one embodiment, the heat exchange medium flows through the heat exchange medium flow channels 15C at a temperature lower than a temperature of the main flow path 11M of a feed stream and/or a recirculating stream to cool the stream(s). Additionally or alternatively, the heat exchange medium flows through the heat exchange medium flow channels 15C at a temperature above a precipitation point of polymer. For example, the heat exchange medium may flow through the heat exchange medium flow channels 15C at a temperature of about 100° C. or more. If the reaction is endothermic, then a heat exchange medium may alternately be at a temperature higher than the process fluid and provide heat to enable the reaction to be conducted at an economically and/or technically feasible rate. In some embodiments, a percentage of the volume of the internal heat exchanger 13 configured to be occupied by the process stream is from about 1% to about 99%, such from about 20% to about 60%.

In some embodiments, the at least one internal heat exchanger 13 removes heat (e.g., produced during the polymerization reaction) from the process fluid volume at a rate from about 100 to about 5,000 Btu/hour cubic foot·° F., such as from about 550 to about 3,400 Btu/hour cubic foot·° F. In some embodiments, the at least one internal heat exchanger 13 removes heat (e.g., produced during the polymerization reaction) from the heat exchanger volume (including process fluid, the metal, and the utility) at a rate from about 50 to about 2,000 Btu/hour cubic foot·° F., such as from about 200 to about 1,400 Btu/hour cubic foot·° F.

In some embodiments, the at least one internal heat exchanger 13 provides a heat transfer coefficient (HTC) from about 1 to about 1,000 BTU/hr·° F.·ft², such as about 10 to about 100 BTU/hr·° F.·ft². The HTC of the at least one internal heat exchanger 13 is defined by the following equations (1A-C):

$$Q = UA \frac{\Delta T_1 - \Delta T_2}{\ln(\Delta T_1 / \Delta T_2)} \quad (1A)$$

$$\Delta T_1 = T_{p,in} - T_{u,out} \quad (1B)$$

$$\Delta T_2 = T_{p,out} - T_{u,in} \quad (1C)$$

in which U is the heat transfer coefficient, p is the process, u is the utility, A is the heat transfer area, and Q is the heat flow across the walls of the heat exchanger. In some embodiments, the at least one internal heat exchanger 13 provides a Nusselt number from about 3.6 to about 10,000, such as from about 20 to about 750.

In some embodiments, use of the at least one internal heat exchanger 13 in the polymerization process results in a low pressure drop, which results in higher recirculation and production rates. For example, a pressure drop across the at least one internal heat exchanger 13 is about 20.0 psi or less, such as from about 0.01 psi to about 20.0 psi.

In various aspects, the monomer, the catalyst system, the polymer product, and optional solvent may be maintained substantially as a single liquid phase under polymerization condition. In some embodiments, the main flow path 11M of a feed stream and/or a recirculating stream through the at least one internal heat exchanger 13 may be substantially creeping, laminar, or near-laminar.

The polymerization processes may be conducted at a temperature from about 50° C. to about 220° C. The polymerization process may be conducted at a pressure from about 120 to about 1800 psi. The polymerization process may be conducted with a recycle ratio of zero to about 50. The polymer product may be produced at a rate of ≥ about 0.5 pounds per hour per gallon total reactor volume including the heat exchanger metal and utility for an individual internal heat exchanger.

The spiral heat exchanger types of reactor can be used alone, in conjunction with one or more spiral heat exchanger types of reactors, and/or in conjunction with other types of reactors such as a CSTR, fluidized bed, loop, slurry and/or tubular reactor in a polymerization system. The reactors can be arranged in either series or parallel configurations. The polymerization system can also be used to produce in-reactor blends of olefin polymers or copolymers by various permutations and combinations of reactors connected in series and/or in parallel.

FIG. 3A is a schematic illustration of a top cross-sectional view of some embodiments of a reactor head 57 with one or more inlets 59. The one or more inlets 59 are disposed tangentially to a cylindrical body 58 of the reactor head 57. As used herein, the term "tangentially" disposed means any angle θ formed from the inlet to a radium of the cylindrical body of the reactor head of less than 180°, such as less than 155°, such as in a range from about 120° to about 60°.

Figure 3B:
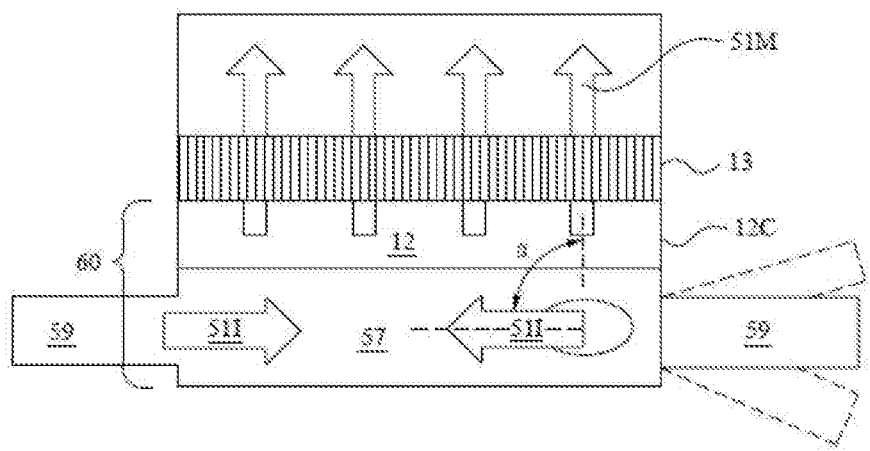
FIG. 3B is a schematic illustration of a side cross-sectional view of some embodiments of a reactor head through plane-A of FIG. 3A.

FIG. 3B is a schematic illustration of a side cross-sectional view of some embodiments of the reactor head 57 through plane-A of FIG. 3A. The reactor head 57 is coupled to a cylindrical body 12C of a reactor 12 similar to the reactor 12 of FIGS. 2A-2B and like numerals have been used for ease of description. One or more internal heat exchangers 13 span a segment of the cylindrical body 12C of the reactor 12 and are positioned downstream of the one or more inlets 59. The flow paths 51I-51M through the reactor head 57 and through the cylindrical body 12C of the reactor 12 comprises an introductory flow path 51I from the one or more inlets 59 transitioning into a main flow path 51M through the internal heat exchanger 13 of the reactor 12. The one or more inlets 59 introduce the introductory flow path 51I into the reactor head 57 in a direction substantially orthogonal to the main flow path 51M through the internal heat exchanger 13 of the reactor 12. Substantially orthogonal may include the introductory flow path 51I versus the main flow path 51M at an angle α of about 70° to about 110°, such as about 80° to about 100°, such as about 85° to about 95°, such as about 88° to about 92°, such as about 90° with respect to the main flow path 51M. For example, the one or more inlets 59 may provide the introductory flow path 51I perpendicular (α=90°) to the main flow path 51M, angled towards (α<90°) the cylindrical body 12C of the reactor 12, or angled away (α>90°) from the cylindrical body 12C of the reactor 12.

The one or more inlets 59 disposed tangentially to the cylindrical body 58 of the reactor head 57 reduce or eliminate the formation of hot spots at an edge of the introductory flow path 51I of a feed stream and/or a recirculating stream or eddies at the entrance zone 60 of the reactor head 57 and cylindrical body 12C of the reactor. The tangential disposed inlets 59 encourage mixing of the introductory flow with the other fluids in the reactor head 57 because the momentum of the introductory flow is no longer aligned with the direction of the apertures through the internal heat exchanger. In some embodiments the introductory flow path 51I has a substantially uniform temperature in the reactor head 57 with a temperature variation within the introductory flow path 51I of about 30° C. or less, such as about 20° C. or less, or such as about 20° C. or less, such as about 3° C. or less.

FIG. 4A is a schematic illustration of a top cross-sectional view of some embodiments of a reactor head 67 with one or more inlets 59 disposed tangentially to a cylindrical body 58 of a reactor head 67. The reactor head 67 further includes one or more axial inlets 68. The reactor head 67 of FIG. 4 is similar to reactor head 57 of FIGS. 3A-3B and like numerals have been used for ease of description. The reactor head 67 is coupled to a cylindrical body 12C (of FIG. 3B) of a reactor 12 in which one or more internal heat exchangers 13 span a segment of the cylindrical body 12C and are positioned downstream of the one or more inlets 59. The axial inlet 68 directs a flow from a central axis region of the cylindrical body 58 of the reactor head 67 to help prevent formation of a hot spot at a central axis region of the cylindrical body 58. The direction of the flow from the axial inlet 68 may be substantially similar to the direction of the main flow path 51M provided by the cylindrical body 12C the reactor 12 or may be introduced at an angle to the main flow path 51M of the reactor 12.

FIG. 4B is a schematic illustration of a top cross-sectional view of some embodiments of a reactor head 67 with one or more inlets 59 disposed tangentially to a cylindrical body 58 of a reactor head 67. The reactor head 67 further includes a substantially cylindrical projection 68B to help prevent formation of a hot spot at a central axis region of the cylindrical body 58. The substantially cylindrical projection 68B may have a circular cross section in one embodiment, or an elliptical, or a rectangular, or a square, or a hexagonal or an octagonal, or any number of sided cross-section where the intention is to prevent a volume at the center of the cylindrical body 58 where hot spots, and/or eddies, and/or dead zones may develop.

FIG. 5 is a schematic illustration of a top cross-sectional view of some embodiments of a reactor head 77 with one or more inlets 59A-B disposed tangentially to a cylindrical body 58 of the reactor head 77 and one or more baffles 72A-D proximate each inlet 59. The reactor head 77 of FIG. 5 is similar to the reactor head 57 of FIGS. 3A-3B and like numerals have been used for ease of description. The reactor head 77 is coupled to a cylindrical body 12C (of FIG. 3B) of a reactor 12 in which one or more internal heat exchangers 13 span a segment of the cylindrical body 12C and are positioned downstream of the one or more inlets 59.

The one or more inlets 59A-B provide introductory flows along an introductory flow paths 51I to impinge on the one or more baffles 72A-D instead of short cutting straight into the heat exchanger 13. The one or more baffles 72A-D may be coupled to a closed end of the cylindrical body 58. The one or more baffles 72A-D proximate each inlet 59A-B may be the same or different lengths. In some aspects, the one or more baffles 72A-D changes the direction of the introductory flow path 51I of a feed stream and/or a recirculating stream. The one or more baffles 72A-D can project to different lengths with the body of the reactor head 77 to divert the flow in increments so that a desired flow path can be established.

In some embodiments, the one or more baffles 72A-D proximate each inlet 59A-B define an introductory flow path 51I to a radial inward direction 74 toward the central axis region of the body 58 of the reactor head 77. In some embodiments, a first baffle 72A is closer to the inlet 59A than a second baffle 72B. For example, baffle 72A is closer to the inlet 59A than baffle 72B, baffle 72B is closer to the inlet 59A than baffle 72C, and/or baffle 72C is closer to the inlet 59A than baffle 72D. In some embodiments, the different positions of the baffles 72A-D to inlets 59A-B helps the baffles 72A-D direct different portions of the introductory flow path 51I of a feed stream and/or a recirculating stream from the inlet 59B to a central axis region of the reactor head 77.

In some embodiments, staggering of the baffles 72A-D with respect to the distance to the inner wall 58I of the cylindrical body 58 helps the baffles 72A-D direct different portions of the introductory flow path 51I of a feed stream and/or a recirculating stream from the inlet 59A to a central axis region 58C of the reactor head 77. In some embodiments, the baffles 72 are staggered in which a first baffle 72 close to the inlet 59 is disposed proximate to a central axis region 58C of the body 58 of the reactor head 77 and a second baffle farther from the inlet 59 is disposed proximate to the inner wall 58I of the body 58 of the reactor head 77. For example, baffle 72B is closer to the inner wall 58I of the cylindrical body 58 than baffle 72A is to the inner wall 58I of the cylindrical body 58, baffle 72C is closer to the inner wall 58I of the cylindrical body 58 than baffle 72B is to the inner wall 58I of the cylindrical body 58, and/or baffle 72D is closer to the inner wall 58I of the cylindrical body 58 than baffle 72C is to the inner wall 58I of the cylindrical body 58.

In some embodiments, the different distances of the baffles 72A-D to the inner wall 58I of the cylindrical body 58 helps the baffles 72A-D direct different portions of the introductory flow path 51I of a feed stream and/or a recirculating stream from the inlet 59A to a central axis region 58C of the reactor head 77.

In some embodiments, the baffles 72 are staggered and have the same lengths in which a first baffle 72 close to the inlet is disposed proximate to a central axis region 58C of the body 58 of the reactor head 77 and a second baffle farther from the inlet is disposed proximate to the inner wall 58I of the body 58 of the reactor head 77. For example, the baffles 72A-D may be the same length in which baffle 72A is disposed closest to the central axis region 58C of the body 58 of the reactor head 77, baffle 72B is disposed farther from the central axis region 58C than baffle 72A, baffle 72C is disposed farther from the central axis region 58C than baffle 72B, and in which baffle 72D is disposed closest to the inner wall 58I of the body 58 of the reactor head.

In some embodiments, the baffles 72 are staggered and have different lengths in which a first baffle 72 closer to the inlet 59 has a length that is shorter than a length of a second baffle 72 farther from the inlet. For example, the baffles 72A'-D' have different lengths in which, baffle 72A' has a length that is shorter than a length of baffle 72B', baffle 72B' has a length that is shorter than a length baffle 72C', and/or baffle 72C' has a length that is shorter than a length of baffle 72D'.

In some embodiments, baffles 76A-B are attached to the cylindrical body 58 proximate an inlet. For example, an attached baffle 76A is attached to the cylindrical body 58 of the reactor head 77 proximate inlet 59A. In some embodiments, the attached baffles 76A-B are substantially parallel or aligned with the respective inlets 59A-B. In some embodiments, the attached baffles 76A-B help to reduce the combination of two flows with each other from two introductory flow paths 51I from two inlets 59A-B. In the embodiment of a reactor head 77 having only one inlet 59A, the attached baffle 76A helps to reduce the recombination of one flow with itself from the one introductory flow path 51I. In some embodiments, the attached baffles 76A-B help to deflect parts of the flow in a non-radial direction to help provide good fluid velocity in the reactor head 77.

Although the baffles 72A-D, 76A-B are shown as symmetric with respect to inlets 59A-B, the baffles number, lengths, widths, and/or position may vary with respect proximate the inlet 59A-B. For examples, each of the baffles 72A-D, 76A-B may have a width that spans a dimension from at least the diameter of the inlets 59A-B to the height of the body 58 of the reactor head.

Figure 6:
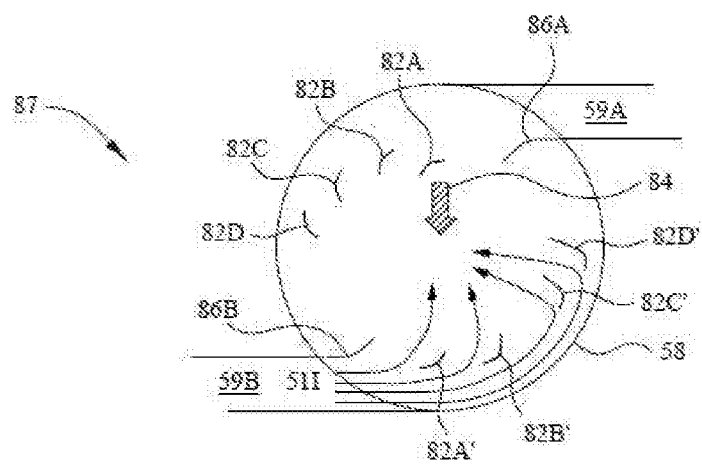
FIG. 6 is a schematic illustration of a top cross-sectional view of some embodiments of a reactor head with one or more tangentially disposed inlets and one or more curved baffles proximate each inlet.

FIG. 6 is a schematic illustration of a top cross-sectional view of some embodiments of a reactor head 87 with one or more inlets 59 disposed tangentially to a cylindrical body 58 of the reactor head 87 and one or more curved baffles 82A-D proximate each inlet 59A-B. The reactor head 87 of FIG. 6 is similar to the reactor heads 57, 77 of FIGS. 3A-3B and 5 and like numerals have been used for ease of description. The reactor head 87 is coupled to a cylindrical body 12C (of FIG. 3B) of a reactor 12 in which one or more internal heat exchangers 13 span a segment of the cylindrical body 12C and are positioned downstream of the one or more inlets 59A-B. The one or more baffles 82A-D may be coupled to a closed end of the cylindrical body 58. The one or more curved baffles 82A-D proximate each inlet 59A-B may have the same or different lengths. The one or more curved baffles 82A-D are curved toward a central axis region 58C of the reactor head 87.

In some embodiments, the one or more curved baffles 82A-D proximate each inlet 59 define an introductory flow path 51I in a radial inward direction 84 toward the central axis region 58C of the body 58 of the reactor head 87. In some embodiments, a first curved baffle 82 is closer to the inlet 59 than a second curved baffle 82 is to the inlet 59. For example, curved baffle 82A is closer to the inlet 59A than curved baffle 82B is to the inlet 59A, curved baffle 82B is closer to the inlet 59A than curved baffle 82C is to the inlet 59A, and/or curved baffle 82C is closer to the inlet 59A than curved baffle 82D is to the inlet 59A. In some embodiments, the different positions of the curved baffles 82A-D to the cylindrical body 58 helps the baffles 82A-D direct different portions of the introductory flow path 51I of a feed stream and/or a recirculating stream from the inlet 59A to a central axis region 58C of the reactor head 87.

In some embodiments, the staggering the curved baffles 82A-D with respect to the distance to the inner wall 58I of the cylindrical body 58 helps the baffles 82A-D direct different portions of the introductory flow path 51I of a feed stream and/or a recirculating stream from the inlet 59A to a central axis region 58C of the reactor head 87. In some embodiments, the curved baffles 82 are staggered in which a first curved baffle 82 close to the inlet 59 is disposed proximate to a central axis region 58C of the body 58 of the reactor head 87 and a second curved baffle farther from the inlet 59 is disposed proximate to the inner wall 58I of the body 58 of the reactor head 87. For example, curved baffle 82B is closer to the inner wall 58I of the cylindrical body 58 than curved baffle 82A is to the inner wall 58I of cylindrical body 58, curved baffle 82C is closer to the inner wall 58I of the cylindrical body 58 than curved baffle 82B is to the inner wall 58I of cylindrical body 58, and/or curved baffle 82D is closer to the inner wall 58I of the cylindrical body 58 than curved baffle 82C is to the inner wall 58I of cylindrical body 58. In some embodiments, the different distances of the curved baffles 82A-D to the inner wall 58I of the cylindrical body 58 helps the curved baffles 82A-D direct different portions of the introductory flow path 51I of a feed stream and/or a recirculating stream from the inlet 59 to a central axis region 58C of the reactor head 87.

In some embodiments, the curved baffles 82A-D are staggered and have the same lengths. For example, the curved baffles 82A-D may be the same length in which curved baffle 82A is disposed closest to the central axis region 58C of the body 58 of the reactor head 87, curved baffle 82B is disposed farther from the central axis region 58C than baffle 82A, curved baffle 82C is disposed farther from the central axis region 58C than baffle 82B, and in which baffle 82D is disposed closest to the inner wall 58I of the body 58 of the reactor head.

In some embodiments, the curved baffles 72A-D are staggered and have different lengths. For example, curved baffles 72A'-D' have different lengths in which curved baffle 82A' has a length that is shorter than a length curved baffle 82B', curved baffle 82B' has a length that is shorter than a length of curved baffle 82C', and/or curved baffle 82C' has a length that is shorter than a length of curved baffle 82D'.

In some embodiments, baffles 86A-B are attached to the cylindrical body 58 proximate an inlet. For example, an attached baffle 86A is attached to the cylindrical body 58 of the reactor head 77 proximate inlet 59A. The attached baffles 86A-B help to reduce the combination of two flows with each other from two introductory flow paths 51I from two inlets 59A-B. In the embodiment of a reactor head 87 having only one inlet 59A, the attached baffle 86A helps to reduce the recombination of one flow with itself from the one introductory flow path 51I. In some embodiments, the attached baffles 86A-B help to deflect parts of the flow in a non-radial direction to help provide good fluid velocity in the reactor head 87.

Although the baffles 82A-D, 86A-B are shown as symmetric with respect to inlets 59A-B, the baffles number, lengths, and/or position may vary with respect to the inlets 59A-B. For examples, each of the baffles 82A-B, 86A-B may have a width that spans a dimension from at least the diameter of the inlets 59A-B to the height of the body 58 of the reactor head.

Figure 7:
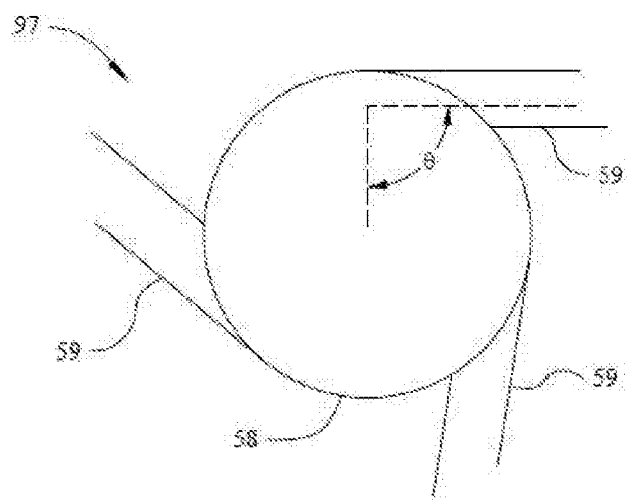
FIG. 7 is a schematic illustration of a top cross-sectional view of some embodiments of a reactor head with three or more inlets disposed tangentially to a cylindrical body of a reactor head.

The reactor heads can have any number of tangential inlets 59A-B, such as from one to four tangential inlets, one to ten tangential inlets, or even more than ten tangential inlets. Larger reactors will benefit by an increase in the number of tangential inlets. FIG. 7 is a schematic illustration of a top cross-sectional view of some embodiments of a reactor head 97 with three or more inlets 59 disposed tangentially to a cylindrical body 58 of the reactor head 97. The reactor head 97 of FIG. 7 is similar to the reactor head 57 of FIGS. 3A-3B and like numerals have been used for ease of description. The reactor head 97 is coupled to a cylindrical body 12C of a reactor 12 in which one or more internal heat exchangers 13 span a segment of the cylindrical body and are positioned downstream of the one or more inlets 59. The inlets 59 are disposed at any angle θ formed from the inlet to a radium of the body of the reactor head of less than 180°, such as less than 135°, such as in a range from about 120° to about 60°.

Figure 8:
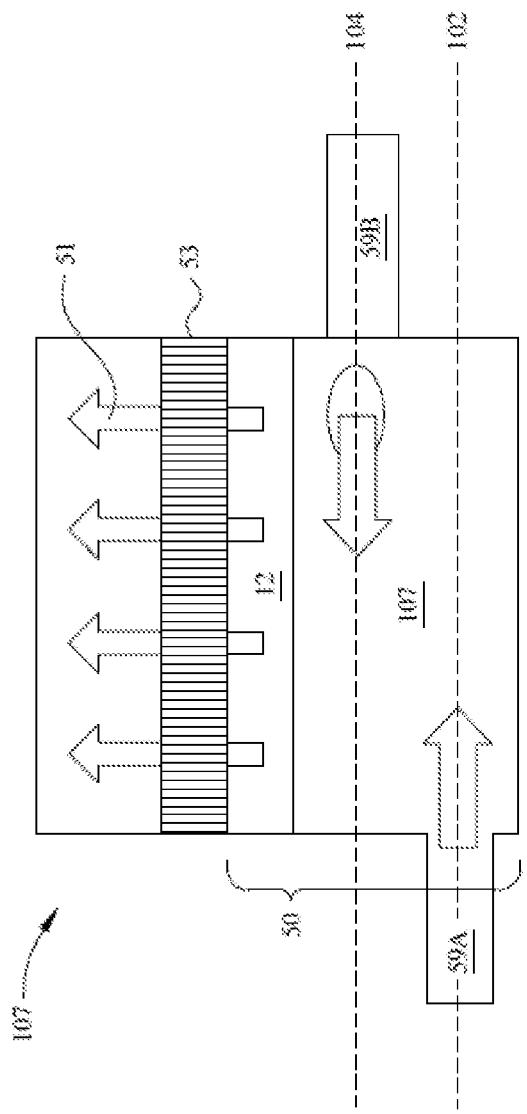
FIG. 8 is a schematic illustration of a side cross-sectional view of some embodiments of a reactor having a reactor head with a first inlet and a second inlet disposed tangentially to a body of the reactor head.

FIG. 8 is a schematic illustration of a side cross-sectional view of some embodiments of a reactor head 107 with a first inlet 59A and a second inlet 59B disposed tangentially to a body of the reactor head 57. The reactor head 107 of FIG. 8 is similar to the reactor head 57 of FIGS. 3A-3B and like numerals have been used for ease of description. The reactor head 107 is coupled to a body of a reactor 12 in which one or more internal heat exchangers 53 span a segment of the cylindrical body and are positioned downstream of the inlets 59A, 59B. The inlets 59A, 59B are disposed at any angle θ formed from the inlet to a radium of the body of the reactor head of less than 180°, such as less than 135°, such as in a range from about 120° to about 60°. The first inlet 59A is disposed on a first plane 102 of the reactor head and the second inlet 59B are disposed a second plane 104 of the reactor head. In some aspects, the inlets 59A-B on different planes 102, 104 may be used to further define the introductory flow paths through the reactor head 107.

In some embodiments, in a polymerization process conducted using a reactor head of the present disclosure (such as one or more of the reactor heads 57, 67, 77, 87, 97, 107 of FIGS. 3-8), the Reynolds number of the introductory flow path 51I of a feed stream and/or a recirculating stream at an inlet 59 may be from about 1 to about 5,000,000, such as from about 300 to about 40,000. The Reynolds number is defined by the following equation (2):

$$\frac{\rho V_{pipe} D_{pipe}}{\mu} \qquad (2)$$

where p is the density of the flow, $V_{pipe}$ the velocity of the flow with respect to cylindrical body of the reactor, $D_{pipe}$ is the inner diameter of cylindrical body of the inlets. At such low Reynolds numbers, hot spots are reduced or eliminated by using one or more aspects of the reactor heads which can reduce stagnant or low velocity zones in the entrance zone of the reactor, such as when the polymerization reaction is exothermic.

The viscosity of the introductory flow 51I of a feed stream and/or a recirculating stream is very high when making polymers using the solution polymerization process. The viscosity can vary widely, from about 0.01 to 10,000 centipoise, such as from about 0.01 to 5,000, such as from about 0.02 to 1000, such as from about 0.02 to 500 centipoise depending on the molecular weight of the polymer product, the concentration of the polymer product in the solution, the type of monomer and comonomers, and the temperature and pressure of the reactor.

In some embodiments, a reactor head of the present disclosure (such as the reactor heads 17, 57, 67, 77, 87, 97, 107 of FIGS. 2-9) are shaped as a cone, a truncated cone, elliptical head, a flat head, or other suitable shape in which the inlet defines an introductory flow path at a tangent to the body of the reactor head.

In some embodiment, a reactor head of the present disclosure includes one or more tangential inlets. The reactor head may optionally include baffles, protrusions, a grid plate, or other structures in the flow path from the tangential inlet to the internal heat exchanger, such as baffles 72A-D, 76A-B, 82A-D, 86A-B of FIGS. 5-6. In some embodiments, the baffles are solid plates. In some embodiments, the baffles are perforated plates.

In some embodiments, a reactor head of the present disclosure may include an inlet with a nozzle to disperse the flow in an direction different that a direction of the main flow through the internal heat exchangers. For example, the inlet may be aligned to the axis of the body of the reactor and the nozzles may direct the flow orthogonal to the main flow through the internal heat exchangers. Such a nozzle may include one or more circular rings that have an inner diameter smaller than the inner diameter of the inlet. For example, the inlet may be aligned to the axis of the body of the reactor and the nozzles may direct the flow at an angle towards the internal heat exchangers.

In some embodiments, the reactor (such as reactor 12 of FIG. 2) comprises a suitable containment structure to contain one or more internal heat exchangers (e.g., heat exchangers 13) through which the main flow path 51M of a feed stream and/or a recirculating stream may flow therethrough. In some embodiments, the reactor comprises one or more loop reactors (LRs) with recirculation of a portion of the polymer product stream back to a tangential inlet of a reactor head. In some embodiments, the reactor comprises one or more loop once-through reactors with no such recirculation.

The cumulative internal age distribution of a some fraction from 0% to 100% of fluid inside the reactor head with age <t is set forth by the following equation (3):

$$\int_0^{t'} I(t')dt' = \int_0^{t'} \left( \frac{1}{\tau} - \frac{1}{\tau} \int_0^{t'} E(t'')dt'' \right) dt' \quad (3)$$

where E(t) is the residence time distribution inside the reactor head and where ti is the mean residence time. In some embodiments of a reactor head with one or more tangential inlets, such as a reactor head as described in reference to FIGS. 2-9, 99% of fluid inside the reactor head has an age less than 10 times the mean residence time (i.e., $$\int_0^{1-10\tau} I(t')dt' = 0.99 \Big),$$

such as an age less than 5 times the mean residence time (i.e., $$\int_0^{3-5\tau} I(t')dt' = 0.99 \Big).$$

Figure 9:
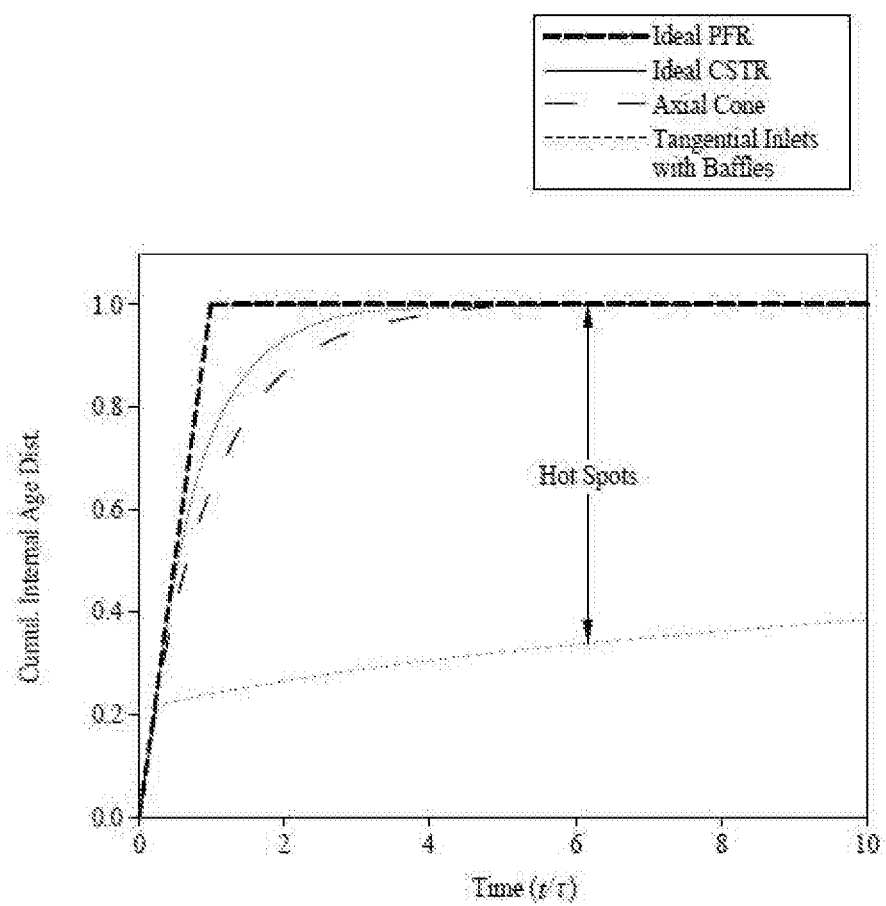
FIG. 9 is a chart of one example of a cumulative internal age distribution for a reactor head with one or more tangential inlets.

FIG. 9 is a chart of one example of a cumulative internal age distribution for a reactor head with one or more tangential inlets. In some aspects, the cumulative internal age distribution for reactor head with one or more tangential inlets with baffles is similar to the cumulative internal age distribution for a theoretical ideal plug flow reactor (PFR). In some aspects, the cumulative internal age distribution for reactor head with one or more tangential inlets with baffles is higher than the cumulative internal age distribution for a theoretical continuous stirred tank flow reactor (CSTR). The gap between the divergence of the cumulative internal age distribution of the reactor head with one or more tangential inlets with baffles versus the cumulative internal age distribution of a conical reactor head with an axial inlet represents hot spots or dead zones in the fluid flow of a conical reactor head with an axial inlet.

Figure 10:
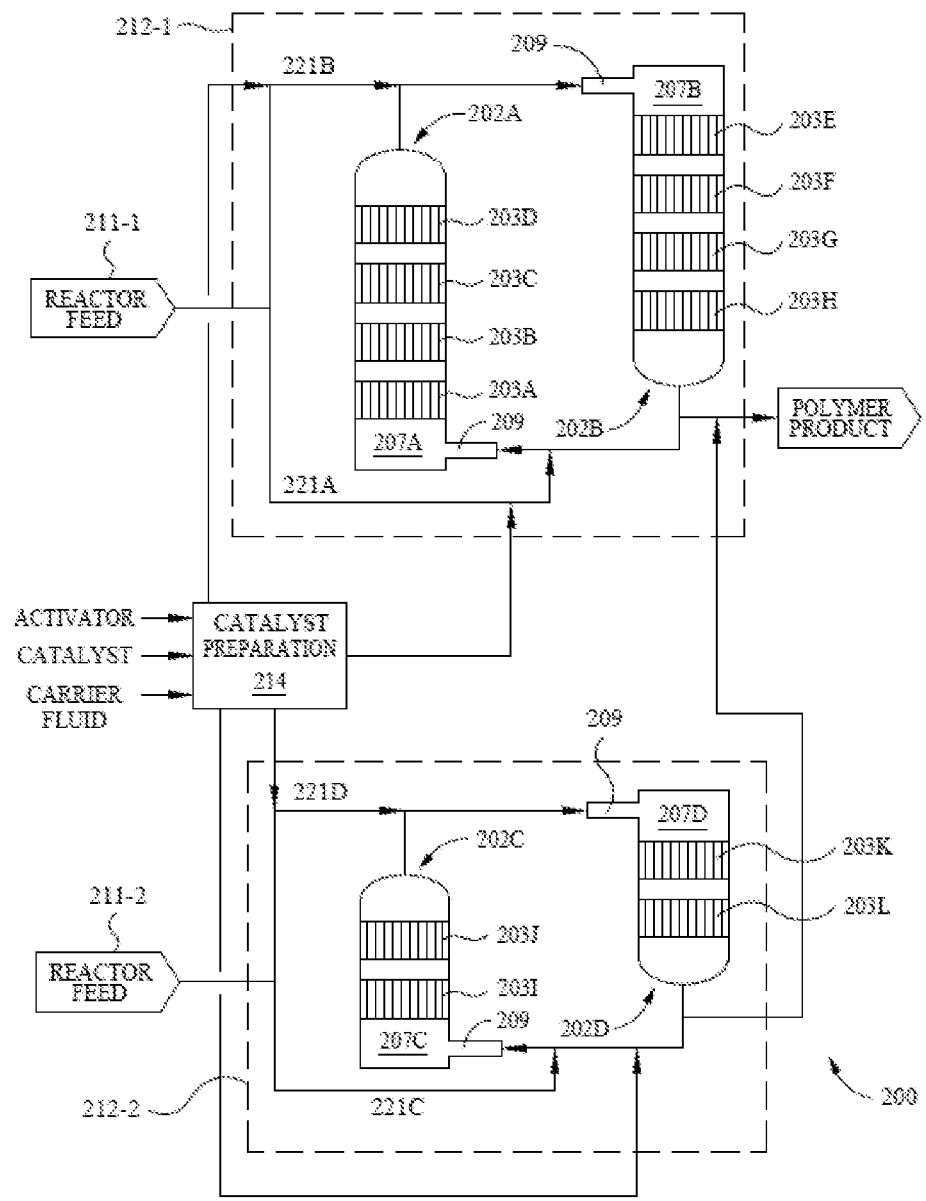
FIG. 10 is a schematic diagram of some embodiments of a polymerization system utilizing a reactor and a reactor head with one or more tangential inlets.

FIG. 10 is a schematic diagram of some embodiments of a polymerization system 200 utilizing a reactor and a reactor head with one or more tangential inlets, such as a reactor and a reactor head as described in reference to FIGS. 2-9. Single reactors, reactors in series or parallel configurations, and/or multiple types of reactors may be used to conduct the polymerization reaction economically to achieve desired polymer properties, monomer conversions, and production rates.

The system 200 includes one or more reactors 202A-D. Each reactor 202A-D includes a reactor head 207A-D with one or more tangential inlets 209. Each reactor 202A-D includes one or more internal heat exchangers 203A-L. Each heat exchanger 203A-L can be any size, such as any length, any width, any number and size of heat exchange medium flow channels, or any number of heat exchanger apertures.

Reactor 202A and 202B are coupled together to form a first loop reactor 212-1 with reactor 202A being a segment flowing in a first direction and with reactor 202B being a segment flowing in a second direction (such as a direction substantially opposite the first direction). A portion of the stream exiting reactor 202B may be recycled back to reactor 202A. Reactor 202C and 202D are coupled together to form a second loop reactor 212-2 with reactor 202C being a segment flowing in a third direction (which may be substantially the same as the first direction) and with reactor 202D being a segment flowing in a fourth direction (which may be substantially the same as the second direction and/or may be a direction substantially opposite the third direction). A portion of the stream exiting reactor 202D may be recycled back to reactor 202C. The number of segments of each loop reactor may vary. The loop reactors may be arranged vertically or horizontally with forward and reverse flowing segments.

Figure 11:
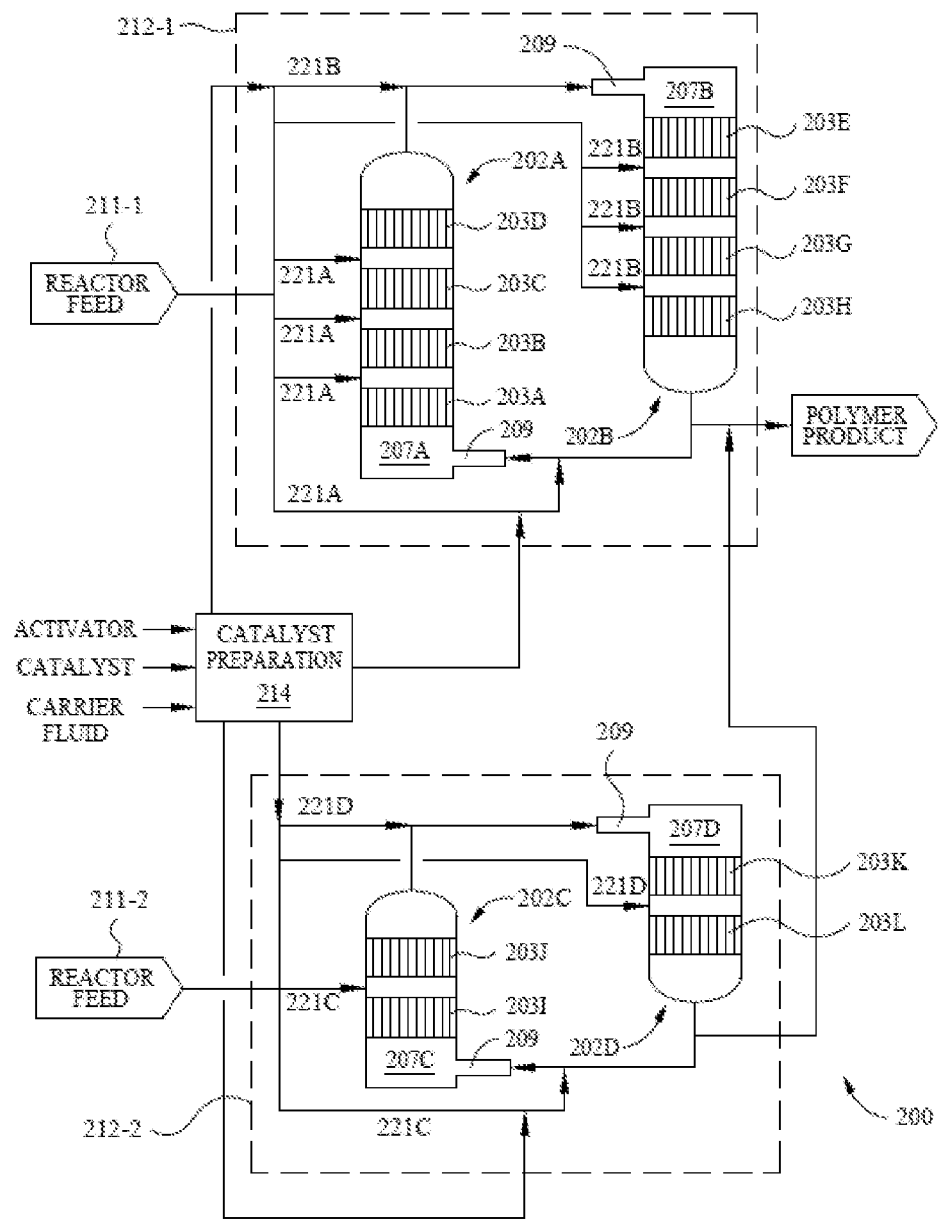
FIG. 11 is a schematic diagram of some additional embodiments of a polymerization system utilizing a reactor and a reactor head with one or more tangential inlets.

The loop reactors 212-1 and 212-2 are arranged in parallel such that the product from the one loop reactor does not enter the other loop reactor. In other embodiments, the loop reactors may be arranged in series where all or a portion of the polymer product from one loop reactor flows through another loop reactor. The number of loop reactors may vary. The feed locations for reactor feeds and catalyst and activators may vary. For example, FIG. 11 is a schematic diagram of some additional embodiments of a polymerization system 200 utilizing a reactor and a reactor head with one or more tangential inlets, such as a reactor and a reactor head as described in reference to FIGS. 2-9. The additional monomer(s), catalyst, activator, and/or mixed catalyst-activator streams in carrier fluid(s) will enable modifying the polymer product microstructure, such as the number of monomer and comonomer units in any given growing polymer chain. Additional and/or alternate locations for reactor feed, catalyst feed, and/or activator feed include locations between each of the reactors 203 A-D and/or 203E-H, and/or 203I-J, and/or 203K-L. The additional and/or alternate feed locations help modulate the reaction temperature and heat release as well as the composition and microstructure of the polymer produced. For instance additional monomer type 1 may be introduced in one location and a different monomer type 2 in another location. The ratios of each monomer and comonomer may also be controlled in this fashion to produce a polymer product with desired attributes.

In some embodiments, the polymerization system, such as the system 200 of FIG. 10 or FIG. 11 or any other suitable system, may include a reactor head, such as a reactor head described in reference to FIGS. 2-11, configured to be operated with a mean residence time of a single pass of a stream from about 0.5 seconds to about 1,000,000 seconds, such as from about 5 seconds to about 25 seconds. In some embodiments, the polymerization system may include an internal heat exchanger, such as an internal heat exchanger described in reference to FIG. 2, 3, 8, 10, or 11, configured to be operated with a mean residence time of a single pass of a stream from about 0.3 seconds to about 1,000,000 seconds, such as from about 3 seconds to about 15 seconds. In some embodiments, the polymerization system may include a reactor, such as a reactor described in reference to FIG. 2, 10, or 11 or any other suitable reactor, configured to be operated with a mean residence time of a single pass of a stream from about 3 seconds to about 1,000,000 seconds, such as from about 30 seconds to about 90 seconds. In some embodiments, the polymerization system may include a loop reactor, such as a loop reactor including two reactors plus the connecting pipes described in reference to FIG. 10 or 11 or any other suitable loop reactor, configured to be operated with a mean residence time of a single pass of a stream from about 10 seconds to about 1,000,000 seconds, such as from about 100 seconds to about 300 seconds. In some embodiments, the polymerization system may include a loop reactor, such as a loop reactor including two reactors plus the connecting pipes described in reference to FIG. 10 or 11 or any other suitable loop reactor, configured to be operated with a mean residence time of overall multiple passes to exit of a stream from about 100 seconds to about 10,000,000 seconds, such as from about 800 seconds to about 6,000 seconds.

The system 200 of FIG. 10 and FIG. 11 can be used for polymerization of any suitable monomers. The system 200 includes one or more reactor feeds 211. The reactor feed 211 provides a feed stream including one or more monomers, such as substituted or unsubstituted $C_2$ to $C_{40}$ olefins (such as $C_2$ to $C_{40}$ alpha-olefins). The monomers are provided in feed streams at proportions suitable for making the corresponding desired polymer. Examples of substituted or unsubstituted $C_2$ to $C_{40}$ olefins include ethylene, propylene, butene, pentene, hexene, heptene, octene, nonene, decene, undecene, dodecene, norbornene, cyclopentene, cycloheptene, cyclooctene, cyclododecene, oxanorbornene, substituted derivatives thereof, isomers thereof, homologs thereof, and mixtures thereof.

In some embodiments, the feed stream includes one or more diolefin monomers. Examples of diolefin monomers include propadiene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, 5-vinyl-2-norbornene, norbornadiene, 5-ethylidene-2-norbornene, divinylbenzene, dicyclopentadiene, and mixtures thereof. In some embodiments, diolefin monomers are present in the polymer product at up to 20 wt %, such as at 0.00001 wt % to 10.0 wt %.

Reactor feed stream 211 may provide a feed stream comprising a solvent. The feed stream may be cooled or may be heated depending on the desired reaction kinetics. In some embodiments, a solvent may be present during the polymerization process. Examples of solvents for polymerization include non-coordinating, inert liquids. Examples of non-coordinating, inert liquids include straight, branched-chain, cyclic, alicyclic, halogenated, or aromatic hydrocarbons and mixtures thereof. Examples of straight and branched-chain hydrocarbons include isobutane, butane, pentane, isopentane, hexane, isohexane, heptane, octane, dodecane, and mixtures thereof such as ISOPAR E from ExxonMobil of Houston, Tex., etc. Examples of cyclic and alicyclic hydrocarbons include cyclohexane, cycloheptane, methylcyclohexane, methylcycloheptane, and mixtures thereof. Examples of halogenated hydrocarbons include fluorinated $C_4$-$C_{10}$ alkanes and chlorobenzene. Examples of aromatic compounds include benzene, toluene, mesitylene, and xylene. In some embodiments, the feed stream includes solvent for the polymerization of 40 vol % or more, such as 60 vol % or more, such as 80 vol % or more, such as 95 volume % or more, based on the total volume of the feed stream. In other embodiments, the monomers and/or comonomers act as the diluent/solvent of the polymerization reaction.

A polymerization process for forming polymer includes contacting a monomer, an optional comonomer, and a catalyst system in a reaction zone including at least one internal heat exchanger, such as a spiral heat exchanger, and recovering polymer. The polymerization process includes any exothermic reaction in which heat is removed by the at least one internal heat exchanger. In some embodiments, he polymerization processes is carried out in a liquid phase process, such as solution, suspension, slurry, bulk, or emulsion polymerization processes. In some embodiments, the polymerization process is a solution polymerization process. In some embodiments, the polymerization processes is carried out in a gas phase process. The polymerization processes can be run in a batch, semi-batch, or continuous mode. In some embodiments, the polymerization process is continuous.

In some embodiments, the polymerization process is a solution phase process. In a solution polymerization process, the monomer, the optional comonomer, and catalyst system are contacted in a solution phase and polymer is obtained. In some embodiments, the solution phase process is run with solvent. In some embodiments, the solution phase process is run in a bulk process where one of the monomers also acts as diluent or solvent without need for any chemically different additional solvent(s).

In some embodiments, the polymerization process is a slurry process. A slurry polymerization process generally operates between 1 to about 150 atmosphere pressure range (15 psi to 2205 psi, 103 kPa to 15450 kPa) or even greater and temperatures in a range of 0° C. to about 250° C., such as within a range of about 30° C. to about 220° C. In a slurry polymerization, a suspension of solid, particulate polymer is formed in a liquid polymerization diluent medium to which monomer and comonomer, along with catalyst, are added. The suspension, including diluent, is intermittently or continuously removed from the reactor where the volatile components are separated from the polymer and recycled, optionally after a distillation, to the reactor. The liquid diluent employed in the polymerization medium is typically an alkane having from 3 to 7 carbon atoms. The medium employed should be liquid under the conditions of polymerization and relatively inert. A slurry process is also described, for instance, in U.S. Pat. No. 3,248,179; which is incorporated herein by reference.

Any suitable polymerization catalyst, for example a Ziegler-Natta catalyst system, chromium catalysts, metallocene catalyst system, pyridyldiamide catalyst or other single site catalysts, or a combination thereof including a bimetallic (i.e., Z/N and/or metallocene) catalyst, can be used in the internal heat exchange reactor, such the spiral heat exchange reactor. The catalyst (e.g., olefin polymerization catalyst compound, such as metallocene compound, pyridyldiamido compound, etc.) and activator may be combined in any order. For example, the catalyst (e.g., olefin polymerization catalyst compound, such as metallocene compound, pyridyldiamido compound, etc.) and the activator may be combined prior to contacting the monomer. Alternatively, the activator may be added to a solution of the monomer and the catalyst (e.g., olefin polymerization catalyst compound, such as metallocene compound, pyridyldiamido compound, etc.). In some embodiments, the activator and catalyst (e.g., olefin polymerization catalyst compound, such as metallocene compound, pyridyldiamido compound, etc.) are contacted to form the catalyst system prior to entering the at least one internal heat exchanger, such as a spiral heat exchanger.

The catalyst system may further comprise a support. Typical support may be any support such as talc, an inorganic oxide, clay, and clay minerals, ion-exchanged layered compounds, diatomaceous earth, silicates, zeolites or a resinous support material such as a polyolefin.

The catalyst system may be dried and introduced into the internal heat exchanger, such as the spiral heat exchanger, as a solid (such as a powder), suspended in mineral oil and introduced as a mineral oil slurry, combined with typical hydrocarbon solvent material (such as hexane, isopentane, etc.) and introduced as a suspension, or any other means.

Returning to FIG. 10 and FIG. 11, reactor feed 211-1 provides one or more feed sub-streams 221A-B to the loop reactor 212-1 to introduce a feed stream at one or more points along the segments of the loop reactor 212-1. The flow rates of each of feed sub-streams 221A-B of the reactor feed 211-1 may be set to a desired level. For example, the flow rates of one or more feed streams 221A-B to the loop reactor 212-1 are selected to tailor the molecular weight distribution and composition distribution along the growing polymer chains. For instance, additional monomer or monomers may be introduced at one or more points along the segments of the loop reactor 212-1 to obtain the desired composition distribution of the various monomers used in the polymerization.

Reactor feed 211-2 provides one or more feed sub-streams 221C-D to the loop reactor 212-2 to introduce a feed stream at one or more points along the segments of the loop reactor 212-2. The flow rates of each of feed sub-streams 221C-D of the reactor feed 211-2 may be set to a desired level. For example, the flow rates of the feed sub-streams 221C-D of reactor feed 211-2 may be set to the same, similar, or different level to the flow rates of the feed sub-streams 221A-B of the reactor feed 211-1 to produce the same, similar, or different polymer product.

The flow rates from the catalyst preparation 214 provide activator species and catalyst species to one or more points along the segments of each loop reactor. For example, a feed sub-stream of activator species and catalyst species may be provided between heat exchangers of reactors 202 A-D. The number of feed sub-streams of activator species and catalyst species are set to obtain a desired temperature distribution in the loop reactor 212 and to provide a some level of catalyst efficiency.

A reactor head 207A-D with the tangential inlet 209 provides a residence time distribution more similar to a plug flow reactor than using an axial conical reactor head and provide a more uniform and reproducible polymer product.

In each loop reactor 212, the feed stream is introduced at one or more suitable points in the loop and the polymer product is withdrawn at another suitable point from the recirculating flow. The ratio by mass of total recirculating flow to fresh feed flow is typically in the range of 0 to 50. For example, the ratio by mass of total recirculating flow to fresh feed flow can be varied from 0 (to mimic the performance of a tubular once-through reactor) to 15 and above (to mimic the performance of a CFSTR). The circulation ratio may also be expressed as the ratio of total mass circulating in the loop divided by the mass flow rate of the effluent stream leaving the reactor loop.

Reactants, solvents, catalysts, scavengers, modifiers, other feedstock, polymer product, feed stream, and/or recirculating stream (collectively referred to as "stream") flow through the each loop reactor 212-1 and 212-2 at a specified rate to obtain a desired polymer product. The characteristics of the polymer product (such as composition, molecular weight, and tacticity) depend in part on a temperature of the stream in the reactor heads 207A-D. Small temperature differences within a reactor head 207A-D and/or within the entrance zone of the reactor provide a polymer product with a different distribution of properties. A wide distribution of polymer properties results in differences in processability and performance in the final application of the polymer. Reducing the variability in local temperature of the reactor heads 207A-D and/or the entrance zone of the reactor utilizing tangential inlets 209 enables producing a repeatable polymer product with desired properties. In some embodiments, the reactor head further includes one or more baffles, such as straight or curved baffles, to help distribute the introductory flow path of a feed stream and/or a recirculating stream and to reduce temperature variations of the introductory flow path of a feed stream and/or a recirculating stream within the reactor head and/or within the entrance zone of the reactor. In some embodiments, a reactor head comprises one or more tangential inlets define an introductory flow path to an entrance zone of a reactor, which may be utilized in a polymerization process where the Reynolds numbers of a feed stream and/or a recirculating stream are small at the entrance zone.

EMBODIMENTS LISTING

The present invention provides, among others, the following embodiments, each of which may be considered as optionally including any alternate embodiments.

Clause 1. A reactor, comprising:
  a reactor body; and
  a reactor head, comprising:
    a reactor head body; and
    one or more inlets disposed tangentially to the reactor head body.

Clause 2. The reactor of Clause 1, further comprising one or more internal heat exchangers, each internal heat exchanger spanning a segment of the reactor body, wherein the one or more internal heat exchangers are positioned downstream of the reactor head.

Clause 3. The reactor of Clauses 1 or 2, wherein the one or more internal heat exchangers comprises one or more spiral heat exchangers.

Clause 4. The reactor of any of the Clauses 1 to 3, wherein the reactor body is cylindrical.

Clause 5. The reactor of any of the Clauses 1 to 4, wherein the one or more inlets comprises a first set of one or more inlets positioned along a first plane of the reactor head body and a second set of one or more inlets positioned along a second plane of the reactor head body.

Clause 6. The reactor of any of the Clauses 1 to 5, wherein the one or more inlets are configured to define one or more introductory flow paths in a first direction and wherein the reactor body is configured to provide a main flow path in a second direction orthogonal to the first direction.

Clause 7. The reactor of any of the Clauses 1 to 6, wherein the one or more inlets of the reactor head are angled in a direction towards the reactor body.

Clause 8. The reactor of any of the Clauses 1 to 7, wherein the one or more inlets of the reactor head are angled in a direction away from the reactor body.

Clause 9. The reactor of any of the Clauses 1 to 8, wherein the reactor head further comprises an axial inlet configured to define an additional introductory flow path axial to the reactor head body.

Clause 10. The reactor of any of the Clauses 1 to 9, wherein the axial inlet is configured to define the additional introductory flow path in a direction substantially similar to the second direction of the reactor body.

Clause 11. The reactor of any of the Clauses 1 to 10, wherein a center line of the one or more internal heat exchangers is substantially aligned with a center line of the reactor body.

Clause 12. The reactor of any of the Clauses 1 to 11, wherein a center line of the one or more internal heat exchangers is offset with a center line of the reactor body.

Clause 13. A reactor, comprising:
  a reactor body; and
  a reactor head, comprising:
    a reactor head body;
    one or more inlets disposed tangentially to the reactor head body; and
    one or more baffles proximate each of the one or more inlets.

Clause 14. The reactor of Clause 13, further comprising one or more internal heat exchangers, each internal heat exchanger spanning a segment of the reactor body, wherein the one or more internal heat exchangers are positioned downstream of the reactor head.

Clause 15. The reactor of Clauses 13 or 14, wherein the one or more internal heat exchangers comprises one or more spiral heat exchangers.

Clause 16. The reactor of any of the Clauses 13 to 15, wherein the one or more inlets are configured to define one or more introductory flow paths in a first direction and wherein the reactor body is configured to define a main flow path in a second direction orthogonal to the first direction.

Clause 17. The reactor of any of the Clauses 13 to 16, wherein the one or more baffles are configured to define the one or more introductory flow paths in a direction radially inward to the reactor head body.

Clause 18. The reactor of any of the Clauses 13 to 17, wherein the one or more baffles are curved.

Clause 19. The reactor of any of the Clauses 13 to 18, wherein the reactor head body has a cylindrical shape with a single closed end.

Clause 20. The reactor of any of the Clauses 13 to 19, wherein the one or more baffles proximate each of the one or more inlets is at least partially attached to the single closed end of the reactor head body.

Clause 21. The reactor of any of the Clauses 13 to 20, wherein the one or more baffles proximate each of the one or more inlets comprises a first baffle to reduce mixing between one flow from one of the inlets and another flow from another of the inlets.

Clause 22. The reactor of any of the Clauses 13 to 21, wherein the one or more baffles proximate each of the one or more inlets comprises a first baffle parallel to one of the inlets.

Clause 23. A reactor, comprising:
  a reactor body; and
  a reactor head, comprising:
    a cylindrical reactor head body having an inner wall;
    an inlet disposed tangentially to the reactor head body;
    a staggered first baffle and a staggered second baffle proximate the inlet, and
    wherein the first baffle is disposed between the inlet and the second baffle and wherein the second baffle is disposed closer to the inner wall of the cylindrical reactor head body.

Clause 24. The reactor of Clause 23, further comprising one or more internal heat exchangers, each internal heat exchanger spanning a segment of the reactor body, wherein the one or more internal heat exchangers are positioned downstream of the cylindrical reactor head.

Clause 25. The reactor of Clauses 23 or 24, wherein the one or more internal heat exchangers comprises one or more spiral heat exchangers.

Clause 26. The reactor of any of the Clauses 23 to 25, wherein the inlet is configured to define an introductory flow path in a first direction and wherein the reactor body is configured to provide a main flow path in a second direction orthogonal to the first direction.

Clause 27. The reactor of any of the Clauses 23 to 26, wherein the first baffle and the second baffle are configured to define the introductory flow path radially inward to the cylindrical reactor head body.

Clause 28. The reactor of any of the Clauses 23 to 27, wherein the first baffle and the second baffle are curved.

Clause 29. The reactor of any of the Clauses 23 to 28, wherein the first baffle and the second baffle are the same length.

Clause 30. The reactor of any of the Clauses 23 to 29, wherein the first baffle and the second baffle are different lengths.

Clause 31. The reactor of any of the Clauses 23 to 30, wherein the first baffle and the second baffle are configured to direct different portions of a flow from the inlet.

Clause 32. The reactor of any of the Clauses 23 to 31, wherein the height of the first baffle and the second baffle are at least greater or equal to a diameter of the inlet.

Clause 33. A polymerization process for forming polymer, comprising:

introducing a stream comprising a monomer in a first direction into a reactor head;

flowing the stream and a catalyst system in a second direction through at least one internal heat exchanger, the second direction orthogonal to the first direction;

polymerizing at least a portion of the monomer in a reaction zone including the at least one internal heat exchanger to produce a polymer product; and recovering the polymer product from the reaction zone.

Clause 34. The polymerization process of Clause 33, wherein the at least one internal heat exchanger comprises at least one spiral heat exchanger.

Clause 35. The polymerization process of Clauses 33 or 34, further comprising flowing a heat exchanger fluid through the at least one spiral heat exchanger in a cross-flow direction to the flow of the stream and the catalyst system through the at least one spiral heat exchanger.

Clause 36. The polymerization process of any of the Clauses 33 to 35, wherein the stream is flowed at an inlet Reynolds number in a range from about 300 to about 40,000.

Clause 37. The polymerization process of any of the Clauses 33 to 36, wherein 99% of the stream inside the reactor head has an age of less than 5 times a mean residence time.

Clause 38. The polymerization process of any of the Clauses 33 to 37, wherein the polymerizing comprises polymerizing the monomer in a solution phase process.

Clause 39. The polymerization process of any of the Clauses 33 to 38, wherein the reaction zone comprises one or more loop reactors.

Clause 40. The polymerization process of any of the Clauses 33 to 39, wherein each loop reactor comprises at least two segments, and each segment comprises the at least one internal heat exchanger.

Clause 41. The polymerization process of any of the Clauses 33 to 40, wherein the stream is introduced by a reactor head with tangential inlets.

Clause 42. The polymerization process of any of the Clauses 33 to 41, wherein the stream introduced has a temperature variation of the stream of 30° C. or less within a reactor head.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I"" preceding the recitation of the composition, element, or elements and vice versa, e.g., the terms "comprising," "consisting essentially of," "consisting of" also include the product of the combinations of elements listed after the term.

For the sake of brevity, only some ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the present disclosure has been described with respect to a number of embodiments and examples, those skilled in the art, having benefit of the present disclosure, will appreciate that other embodiments can be devised which do not depart from the scope and spirit of the present disclosure as described herein.

We claim:

1. A reactor for polymerization, comprising:
   a reactor body; and
   a reactor head disposed about the reactor body, the reactor head comprising:
     a reactor head body; and
     one or more fluid inlets each disposed tangentially to the reactor head body, wherein each inlet provides a fluid flow path into the reactor head in a first direction and wherein the reactor body allows a fluid flow path through the reactor body in a second direction that is orthogonal to the first direction through the reactor head, wherein the one or more fluid inlets comprises a first set of one or more fluid inlets positioned along a first plane of the reactor head body and a second set of one or more fluid inlets positioned along a second plane of the reactor head body, wherein the first plane and the second plane are not the same.

2. The reactor of claim 1, further comprising one or more internal heat exchangers disposed within the reactor body downstream of the reactor head.

3. The reactor of claim 2, wherein the one or more internal heat exchangers comprises one or more spiral heat exchangers.

4. The reactor of claim 1, wherein the reactor body is cylindrical.

5. The reactor of claim 1, wherein the one or more fluid inlets of the reactor head are angled in a direction towards the reactor body.

6. The reactor of claim 1, wherein the one or more fluid inlets of the reactor head are angled in a direction away from the reactor body.

7. The reactor of claim 2, wherein a center line of the one or more internal heat exchangers is substantially aligned with a center line of the reactor body.

8. The reactor of claim 2, wherein a center line of the one or more internal heat exchangers is offset with a center line of the reactor body.

9. The reactor of claim 1, wherein the reactor head is located underneath the reactor body.

10. The reactor of claim 1, wherein the reactor head is located above the reactor body.

11. The reactor of claim 1, wherein the first direction of flow is substantially horizontal and the second direction of flow is substantially vertical.

12. A reactor for polymerization, comprising:
a reactor body; and
a reactor head disposed about the reactor body, the reactor head comprising:
a reactor head body;
one or more fluid inlets each disposed tangentially to the reactor head body, wherein each inlet provides a fluid flow path into the reactor head in a first direction and wherein the reactor body allows a fluid flow path through the reactor body in a second direction that is orthogonal to the first direction through the reactor head;
one or more baffles disposed on the reactor head body and proximate each of the one or more fluid inlets to impede fluid flow through the first direction of the reactor head; and
one or more internal heat exchangers disposed within the reactor body, downstream of the reactor head.

13. The reactor of claim 12, wherein the one or more baffles are configured to define the fluid flow paths into the reactor head in a direction radially inward to the reactor head body.

14. The reactor of claim 13, wherein the one or more baffles are curved.

15. The reactor of claim 13, wherein the reactor head body has a cylindrical shape with a single closed end.

16. The reactor of claim 12, wherein the one or more baffles proximate each of the one or more fluid inlets comprises a first baffle to reduce mixing between one flow from one of the inlets and another flow from another of the inlets.

17. A reactor for polymerization, comprising:
a reactor body configured to allow a fluid flow path therethrough in a first direction; and
a reactor head disposed on the reactor body, the reactor head comprising:
a cylindrical reactor head body having an inner wall;
an inlet disposed tangentially to the reactor head body, the inlet configured to provide a fluid flow path into the reactor head in a second direction that is orthogonal to the first direction through the reactor body; and
a first baffle and a second baffle disposed within the reactor head and proximate the inlet, wherein the first baffle is disposed between the inlet and the second baffle and wherein the second baffle is disposed closer to the inner wall of the cylindrical reactor head body.

18. A polymerization process for forming polymer, comprising:
introducing a monomer and a catalyst system into a reactor having a reactor body and a reactor head disposed about the reactor body, wherein the reactor head comprises:
a reactor head body; and
one or more fluid inlets each disposed tangentially to the reactor head body, wherein each inlet provides a fluid flow path for the monomer, the catalyst system or both the monomer and catalyst system into the reactor head in a first direction, wherein the one or more fluid inlets comprises a first set of one or more fluid inlets positioned along a first plane of the reactor head body and a second set of one or more fluid inlets positioned along a second plane of the reactor head body, wherein the first plane and the second plane are not the same;
flowing the monomer and the catalyst system through the reactor body in a second direction that is orthogonal to the first direction through the reactor head;
polymerizing at least a portion of the monomer in the presence of the catalyst system within the reactor body to produce a polymer product; and
recovering the polymer product from the reactor body.

19. The polymerization process of claim 18, further comprising flowing a heat exchanger fluid through at least one internal heat exchanger located within the reactor body, wherein the heat exchanger fluid flows through the at least one internal heat exchanger in a cross-flow direction to the second flow direction of the monomer and the catalyst system, wherein the at least one internal heat exchanger comprises at least one spiral heat exchanger.

20. The polymerization process of claim 19, wherein a stream of the monomer and the catalyst system is flowed at an inlet Reynolds number in a range from about 300 to about 40,000.

21. The polymerization process of claim 19, wherein 99% of a stream of the monomer and the catalyst system inside the reactor head has an age of less than 5 times a mean residence time.

22. The polymerization process of claim 18, wherein the monomer and the catalyst system have a temperature variation of 30° C. or less within the reactor head.

23. The polymerization process of claim 19, wherein the cross-flow direction of the heat exchanger fluid is substantially parallel to the first flow direction of the monomer and the catalyst system.

24. A reactor for polymerization, comprising:
a reactor body; and
a reactor head disposed about the reactor body, the reactor head comprising:
a reactor head body; and
one or more fluid inlets each disposed tangentially to the reactor head body, wherein each inlet provides a fluid flow path into the reactor head in a first direction and wherein the reactor body allows a fluid flow path through the reactor body in a second direction that is orthogonal to the first direction through the reactor head, and wherein the one or more fluid inlets of the reactor head are angled in a direction towards the reactor body.

25. A reactor for polymerization, comprising:
a reactor body; and
a reactor head disposed about the reactor body, the reactor head comprising:
a reactor head body; and
one or more fluid inlets each disposed tangentially to the reactor head body, wherein each inlet provides a fluid flow path into the reactor head in a first direction and wherein the reactor body allows a fluid flow path through the reactor body in a second direction that is orthogonal to the first direction through the reactor head, and wherein the one or more fluid inlets of the reactor head are angled in a direction away from the reactor body.

26. A reactor for polymerization, comprising:
a reactor body; and
a reactor head disposed about the reactor body, the reactor head comprising:
a reactor head body;
one or more fluid inlets each disposed tangentially to the reactor head body, wherein each inlet provides a fluid flow path into the reactor head in a first direction and wherein the reactor body allows a fluid flow path through the reactor body in a second direction that is orthogonal to the first direction through the reactor head; and one or more baffles disposed on the reactor head body and proximate each of the one or more fluid inlets to impede fluid flow through the first direction of the reactor head, wherein the one or more baffles proximate each of the one or more fluid inlets comprises a first baffle to reduce mixing between one flow from one of the inlets and another flow from another of the inlets.

* * * * *